(12) United States Patent
Weinblatt et al.

(10) Patent No.: US 9,124,916 B2
(45) Date of Patent: Sep. 1, 2015

(54) INTERACTIVE REWARD ASSOCIATED WITH A BROADCAST

(75) Inventors: Lee S Weinblatt, Teaneck, NJ (US); Edward M. Weisz, Morganville, NJ (US)

(73) Assignee: Winmore, Inc., Tenafly, NJ (US)

( * ) Notice: Subject to any disclaimer, the term of this patent is extended or adjusted under 35 U.S.C. 154(b) by 948 days.

(21) Appl. No.: 10/779,506

(22) Filed: Feb. 13, 2004

(65) Prior Publication Data

US 2004/0230993 A1 Nov. 18, 2004

Related U.S. Application Data

(63) Continuation-in-part of application No. 10/080,949, filed on Feb. 20, 2002.

(51) Int. Cl.
| | |
|---|---|
| *H04N 21/41* | (2011.01) |
| *H04N 21/418* | (2011.01) |
| *H04N 21/40* | (2011.01) |
| *H04N 21/426* | (2011.01) |
| *H04N 21/4185* | (2011.01) |
| *G06Q 30/02* | (2012.01) |
| *H04H 20/28* | (2008.01) |
| *H04H 60/33* | (2008.01) |
| *H04H 60/63* | (2008.01) |
| *H04N 7/08* | (2006.01) |
| *H04N 7/16* | (2011.01) |
| *H04N 21/235* | (2011.01) |
| *H04N 21/2543* | (2011.01) |
| *H04N 21/435* | (2011.01) |
| *H04N 21/442* | (2011.01) |
| *H04N 21/4722* | (2011.01) |
| *H04N 21/4784* | (2011.01) |
| *H04N 21/81* | (2011.01) |
| *H04N 21/858* | (2011.01) |

(52) U.S. Cl.
CPC ........... *H04N 21/4117* (2013.01); *G06Q 30/02* (2013.01); *G06Q 30/0225* (2013.01); *G06Q 30/0239* (2013.01); *G06Q 30/0277* (2013.01); *H04H 20/28* (2013.01); *H04H 60/33* (2013.01); *H04H 60/63* (2013.01); *H04N 7/08* (2013.01); *H04N 7/162* (2013.01); *H04N 21/235* (2013.01); *H04N 21/2543* (2013.01); *H04N 21/40* (2013.01); *H04N 21/418* (2013.01); *H04N 21/4182* (2013.01); *H04N 21/4184* (2013.01); *H04N 21/4185* (2013.01); *H04N 21/42661* (2013.01); *H04N 21/42669* (2013.01); *H04N 21/42692* (2013.01); *H04N 21/435* (2013.01); *H04N 21/44222* (2013.01); *H04N 21/4722* (2013.01); *H04N 21/4784* (2013.01); *H04N 21/812* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 5,287,181 A | * | 2/1994 | Holman | 348/473 |
| 6,606,745 B2 | * | 8/2003 | Maggio | 725/23 |

(Continued)

FOREIGN PATENT DOCUMENTS

EP 0 891 084 A2 1/1999

*Primary Examiner* — Justin Shepard
(74) *Attorney, Agent, or Firm* — Cozen O'Connor

(57) ABSTRACT

An interactive technique for generating a supplementary, program-related output. A programming signal and a supplementary, program-related data signal containing rewards data for product or service purchases are combined into a broadcast signal which is then broadcast from a program signal source. The broadcast signal is received, and the programming signal of the received broadcast signal is performed with reproduction equipment for an audience. The rewards data is stored on a portable storage media for use in accessing rewards corresponding to the rewards data. The rewards data can be used for printing coupons used in redeeming the rewards or for use in accessing rewards validation codes for storage on the portable storage media. The portable storage media and/or the printed coupons can then be used to purchase the corresponding goods or services.

18 Claims, 5 Drawing Sheets

(56) References Cited

U.S. PATENT DOCUMENTS

| | | | |
|---|---|---|---|
| 6,766,524 B1 * | 7/2004 | Matheny et al. | 725/23 |
| 7,302,696 B1 * | 11/2007 | Yamamoto | 725/32 |
| 2002/0056091 A1 * | 5/2002 | Bala et al. | 725/34 |
| 2002/0157111 A1 * | 10/2002 | Reams | 725/112 |
| 2003/0014748 A1 * | 1/2003 | Ben-David et al. | 725/23 |
| 2003/0110078 A1 * | 6/2003 | Chang et al. | 705/14 |
| 2003/0110497 A1 | 6/2003 | Yassin et al. | |
| 2003/0159155 A1 | 8/2003 | Weinblatt et al. | |
| 2003/0172376 A1 | 9/2003 | Coffin, III | |
| 2004/0027619 A1 | 2/2004 | Sato et al. | |

* cited by examiner

INTERACTIVE REWARD ASSOCIATED WITH A BROADCAST

CROSS REFERENCE TO RELATED APPLICATIONS

This application is a continuation-in-part of U.S. patent application Ser. No. 10/080,949 which was filed with the U.S. Patent and Trademark Office on Feb. 20, 2002.

BACKGROUND OF THE INVENTION

1. Field of the Invention

This invention is directed to an interactive technique applied while an audience is listening to and/or watching a program broadcast from a programming signal source as it is being performed by reproduction equipment and, more particularly, to interactive broadcasting that enables individual members of that audience to readily obtain a supplementary, program-related output, such as a discount coupon.

2. Background of the Invention

When a program is broadcast, the information it contains may be more limited than the program provider wants to provide and less than the audience member (referred to hereinafter as a "viewer" or "participant") is interested in obtaining. The "program" can be audio and/or video, commercial (e.g. advertisement) and/or non-commercial (e.g. an entertainment show), and is obtained as a programming signal (e.g. a television signal) from a program signal source (e.g. a television station) originated by a program provider (e.g. an advertiser). The "broadcast" of the program can be over the airwaves, cable, satellite, or any other signal transmission medium. This term also applies to playback from recording media such as audio tape, video tape, DAT, CD-ROM, and semiconductor memory. An "audience" for such program reproduction is constituted of the persons who perceive the program.

The program is "performed" by any means which result in some form of perception by human beings, the most common being video and audio. The "reproduction equipment" is any and all types of units to convert a broadcast signal into human perceptible form.

The audience can be described as being "tuned" to a program when the signal source is a TV or radio broadcast station. This term may be less commonly applied when the signal source is a tape recorder, for example. However, for the sake of brevity and convenience, the word "tuned" is applied herein to all situations in which an audience member selects a particular program, whether it be by twisting a dial, operating a remote control, or inserting a cassette or disk into a reader for playback.

It can be readily appreciated that TV programs are restricted to a particular length due to the time period allocated to a show, and the high cost charged for broadcasting a commercial advertisement (referred to herein interchangeably as "commercial" or "advertisement") based on its duration. Many illustrations can be given which show the need to provide materials to supplement the show and/or advertisement. For example, consumers may seek detailed information about an advertised product. A news program could provide viewers with historical information about a person or place currently in the news. Government institutions could provide application forms related to announcements for public services. A retailer could make available an incentive reward, such as discount coupons, to purchase its products. Other rewards could also be available, such as free theater tickets for viewers who qualify by participating in a survey or in a game.

All such broadcast program-related materials, in tangible and intangible form, be they information, rewards or anything else, are collectively referred to herein as "supplementary materials". However, for reasons of brevity and convenience, the ensuing discussion related to the present invention will refer only to incentive rewards, or reward coupons, or just "rewards," for short.

It is well known by TV advertisers, for example, that the experience of viewing an advertised product creates an immediate desire in the viewer to purchase that product. This desire has an initially high level of interest during and shortly after the broadcast, but decreases sharply during a falloff period in the hours that follow. However, if the viewer receives an immediate reward while the level of interest is still high, in the form of a reward coupon for example, an incentive is established for the viewer to retain a high level of interest to purchase the product, or at least higher than it would be otherwise, well beyond the falloff period. Also, the prospect of receiving an immediate reward can convert an attitude of annoyance at having a TV show interrupted by an unwanted commercial into an attitude of at least tolerance and perhaps even a degree of interest in the commercial.

Viewers have been provided during broadcasts with telephone numbers and/or website addresses for obtaining the rewards offered by advertisers. However, the need to memorize or write down the telephone numbers and/or URLs is an inconvenience as well as a source for error. Consequently, prior art techniques have been developed for providing interactive access to such rewards. The word "interactive" as utilized herein denotes an activity that takes place during the course of a broadcast. The aim of such interactive access is to enable and facilitate access to the rewards without having to write down or memorize anything. Access should be gained with only a simple manual intervention by the viewer.

Several techniques for interactive access to web sites on the Internet are known. However, such techniques have various shortcomings. For example, they are relatively complex in design and the use of an additional computer with a separate display is required at the viewer end. Also, the interactive access takes over a communication line, such as a telephone line, making it unavailable for its normal use.

SUMMARY OF THE INVENTION

One object of the present invention is to provide an improved interactive technique for obtaining supplementary, program-related outputs, such as rewards.

Another object of the present invention is to provide an effective interactive technique for obtaining such program-related rewards that requires minimal equipment at the viewer end.

A further object of the present invention is to provide an interactive technique for interactively obtaining such program-related rewards that is simple and convenient to use by the viewer.

These and other objects are attained in accordance with one aspect of the present invention directed to an interactive method for generating a supplementary, program-related output, comprising obtaining a programming signal and a supplementary, program-related data signal. The programming signal and the supplementary, program-related data signal are combined into a broadcast signal which is then broadcast from a program signal source. The broadcast signal is received and the programming signal of the received broadcast signal is performed with reproduction equipment for an audience. The supplementary, program-related data signal of the received broadcast signal is stored, and retrieval of the stored supplementary, program-related data signal is enabled interactively with the programming signal being performed. In response to a control signal being actuated by a member of the audience tuned to the programming signal being performed, the stored supplementary, program-related data signal is retrieved and used to generate the supplementary, program-related output.

Another aspect of the invention is directed to an apparatus for interactively generating a supplementary, program-related output. The apparatus includes means for combining a programming signal and a supplementary, program-related data signal into a broadcast signal, and then broadcasting the broadcast signal from a program signal source. Means are provided for receiving the broadcast signal and for performing the programming signal of the received broadcast signal with reproduction equipment for an audience. The supplementary, program-related data signal of the received broadcast signal is stored, and means is provided for enabling retrieval of the stored supplementary, program-related data signal interactively with the programming signal being performed. Responsive to a control signal being actuated by a member of the audience tuned to the programming signal being performed, the stored supplementary, program-related data signal is interactively retrieved and used to generate the supplementary, program-related output.

Another aspect of the invention involves storing supplementary, program-related data, also referred to herein, as "rewards data", on a portable electronic storage media such as a smartcard. The rewards data can be accessed from the smartcard using a media reader connected, for example, to a PC or other data display device which may also provide access to the Internet. The rewards data may include URL addresses to access websites containing information about specific rewards, and may also include authorization codes associated with the rewards. The authorization codes can be used to determine whether a viewer is eligible to receive specific rewards and, if so, validation codes can be stored on the smartcard to enable a viewer to obtain the eligible rewards at a later time.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
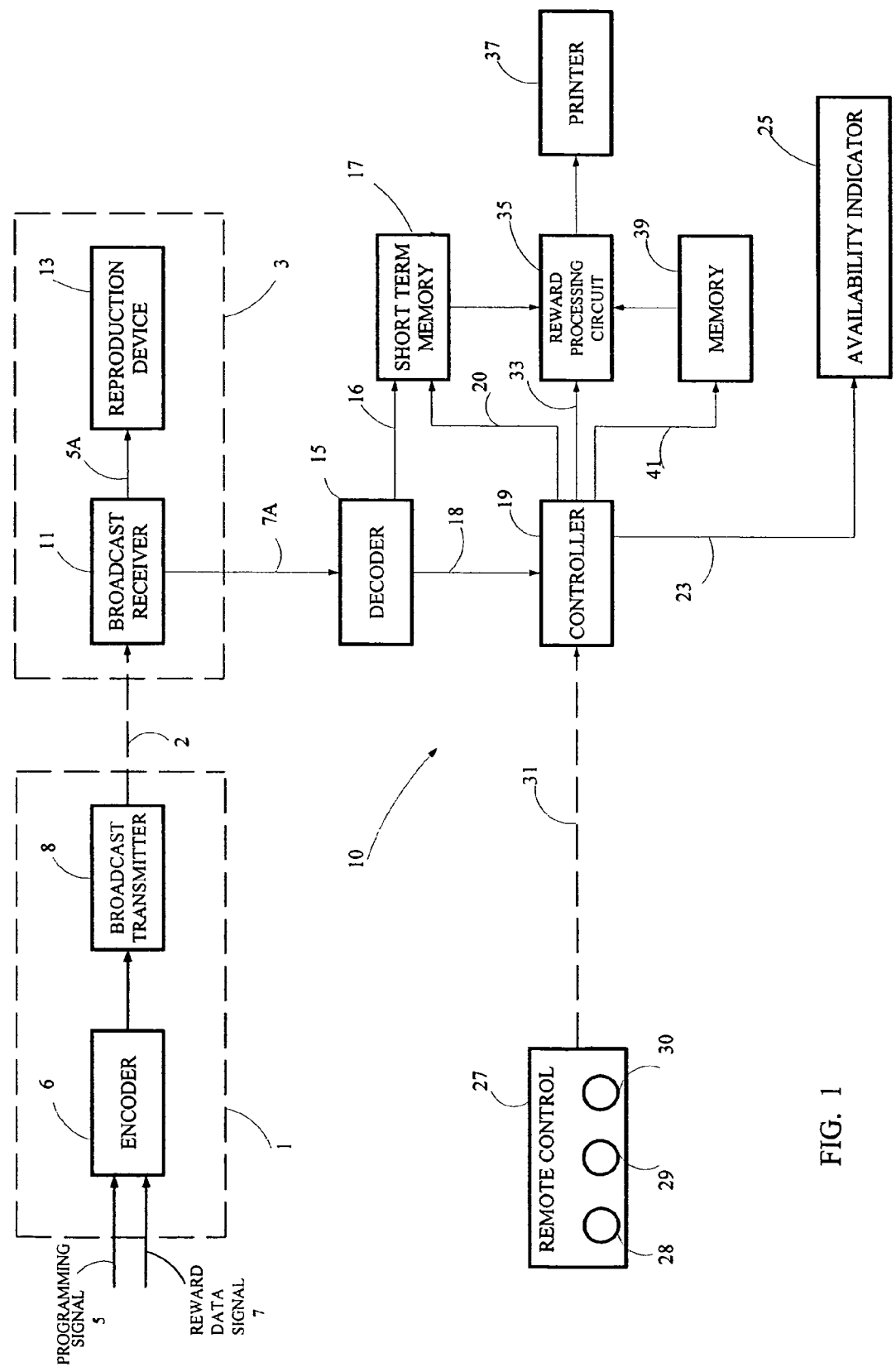
FIG. 1 is a schematic block diagram of the invention.

The present invention relies on the following key components. As shown in FIG. 1, a programming signal source 1, such as a television ("TV") broadcast station, generates an output signal 2 which is a combination of a programming signal 5 and a reward data signal 7. Signal 2 is received by program reproduction apparatus 3 which can be capable of suitably reproducing the programming signal for video and/or audio performance. The received signal 2 is inputted to reward output apparatus 10 which can be manually activated by the viewer, such as with remote control 27, to interactively print a reward on a printer 37.

The present invention is particularly valuable to an advertiser who is offering a discount coupon applicable toward purchase of the product being advertised. Turning now to a more detailed explanation of the present invention, a reward data signal is provided along with the programming signal in order to enable printing a reward coupon interactively with the program to which the viewer is tuned. Thus, the conventional programming signal 5 is encoded by encoder 6 with a reward data signal 7. The term "encoded" is used in the broadest sense to include any and all techniques for combining a programming signal with another signal for broadcasting both together by a well known, commonly used broadcast transmitter 8. At the viewer end, both signals are received, separated, processed and reproduced. The specific technique chosen depends on various design considerations. The reward data signal can be either analog or digital. The encoding, transmission, detection and decoding of such data signals are conventional and readily apparent to anyone with ordinary skill in the art. Such specifics do not form a part of the present invention. Details thereof would add unnecessarily to the length and complexity of this description. Consequently, such details are not provided herein.

In accordance with a key aspect of the present invention, the reward data signal. 7 includes all of the data specific to the particular reward coupon that is required to print it. Such data includes, for example, the text, font, formatting, symbols, background color, font color, and the like. All of this data is included in a reward data signal 7, is combined with programming signal 5, and is transmitted along with the programming signal as part of output signal 2. A variation of this approach is presented below in connection with a discussion of memory 39.

Broadcast output signal 2 is received by program reproduction apparatus 3. In particular, receiver 11 processes the received programming signal 5 and inputs it, as signal 5A, to reproduction device 13. Thus, if apparatus 3 is a TV set, receiver 11 could be a tuner, and device 13 is the TV screen. Receiver 11 can include circuitry to extract the programming signal and/or the reward data signal from signal 2. Such circuitry is well known, and thus details thereof are not needed herein.

The reward data signal 7 is provided, as signal 7A, to decoder 15. Alternatively, signal 2 can be inputted directly to decoder 15. Decoder 15 outputs a reward printing signal 16 to short term memory 17. Signal 16 can be identical to signal 7A, it can be a minimally changed version thereof (e.g., amplified), or it can be a substantially changed version, depending on the specific signals and encoding/decoding technique chosen based on well known design considerations.

For example, decoder 15 can accumulate therein all the data required to print one reward coupon, for example. When the accumulation of that data is completed, it could all be transferred into short term memory 17. Alternatively, the accumulation and storage of data for an entire coupon would take place in memory 17 under control of controller 19 (discussed below). In any case, memory 17 stores therein data corresponding to a reward for as long as it needs to be kept available for selection by the viewer interactively with the program being performed and to which the viewer is tuned.

When that situation changes, such as when a new reward is offered during that same program, or in a different program to which the viewer is tuned, controller 19 can reset memory 17, and the data for the new reward is stored in the newly reset memory 17.

When decoder 15 detects a reward as part of signal 2, it generates a reward recognition signal 18 to controller 19. This results in controller 19 generating a memory control signal 20.

When controller 19 receives the reward recognition signal 18, it generates indicator output signal 23 to availability indicator 25. Indicator 25 can generate a visual, audible or sensory signal to alert the viewer to the fact that a reward is interactively available during the program to which the viewer is then tuned. The viewer is provided with a handheld, remote control device 27, such as is commonly used with TVs. Such a device includes buttons 28, 29 and 30 depicted for illustrative purposes. Of course, device 27 typically includes many such buttons. Button 30, for example, could be a programmable button on a generally available remote control device, or it would be a specific button on a customized device 27. In any case, when the viewer depresses button 30 in response to an alert received from indicator 25, and due to the interest by the viewer in a reward then being offered, the reward can be interactively printed as follows. As a result of button 30 being depressed, remote control device 27 generates output signal 31 which is inputted to controller 19. The remote control can be connected to controller 19 directly by wire or through remote transmission. In either case, controller 19 responds to signal 31 by generating print control signal 33 to reward processing circuit 35. Reward processing circuit 35 retrieves the reward printing data then stored in short term memory 17, and processes that signal so as to render it suitable for printing by printer 37. Thus, for example, circuit 35 can have stored therein the printer driver particular to the specific printer 37 being used by the viewer.

To summarize, signal 2 broadcast by the TV station 1 includes both a programming signal and a reward data signal for the reward being made available to the viewer for printing the reward interactively during that program. When such a reward is interactively available, the viewer is alerted to this fact by indicator 25. If the viewer chooses to have that reward printed, button 30 on remote control 27 can be depressed to actuate printer 37 to print the reward for which the data is then stored in short term memory 17.

As explained above, a key aspect of the invention is that the reward data signal 7 includes all of the data required to print a specific coupon, and all of that data is transmitted as part of the broadcast output signal 2. The addition of reward data signal 7 to programming signal 5 adds to the data transmission burdens both at the transmitting end and the receiving end. Although text-heavy reward coupons should not normally be too burdensome in this regard, image-heavy coupons may have a more significant impact. In any case, it may be advantageous to limit the amount of additional data that needs to be broadcast due to the inclusion of the reward data signal in output signal 2. One way of doing so is to permanently store at the viewer's location some of the reward data that is required to print a reward coupon and which is common to all interactively available rewards. This data is stored in memory 39. Thus, the common reward printing data is stored in memory 39, whereas only the data specific to one reward is broadcast as part of output signal 2. For example, such common reward printing data could be related to the formatting of the rewards. Thus, when controller 19 receives an output signal 31, it generates another memory control signal 41 to memory 39. This triggers the transfer of information from memory 39 to reward processing circuit 35. Circuit 35 then combines the specific reward printing data from short term memory 17 with the common reward printing data from memory 39, and then transfers the combined printing data to printer 37 for the printing of the reward coupon.

Figure 2:
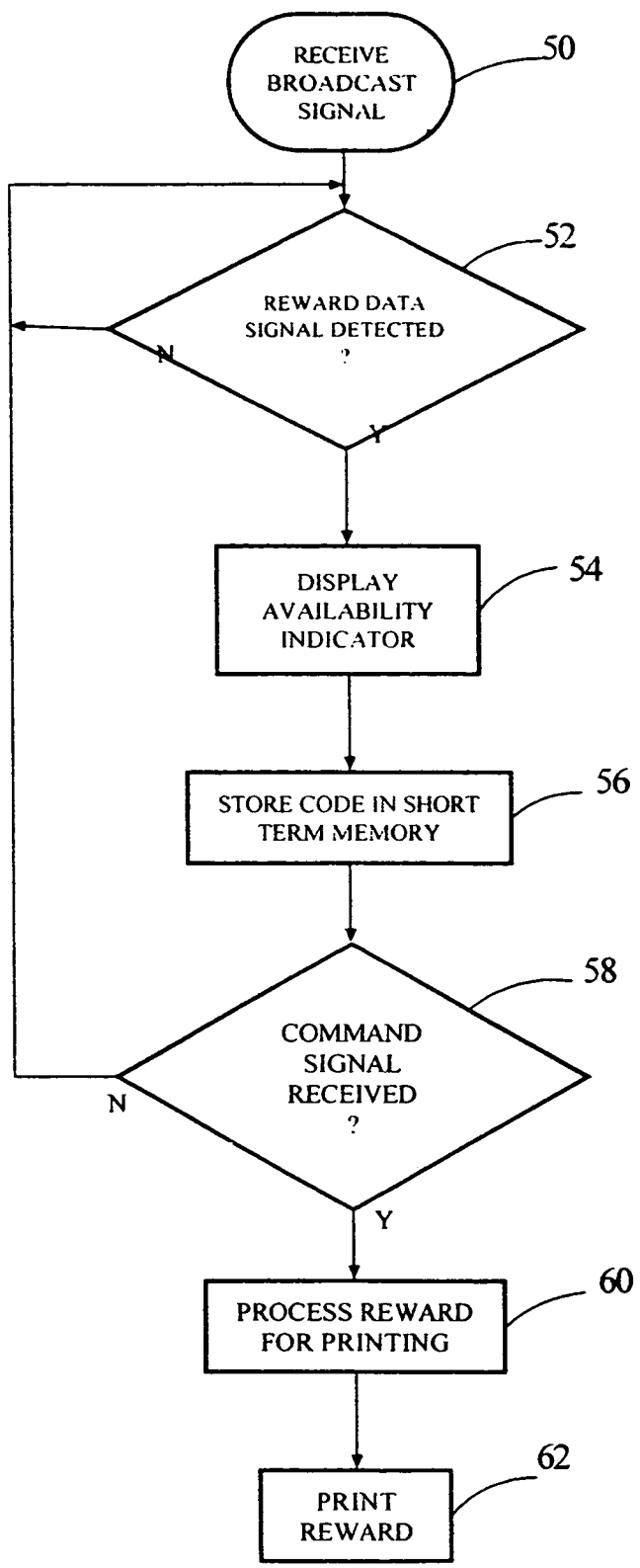
FIG. 2 is a flow chart showing operations performed by the arrangement of FIG. 1.

FIG. 2 shows the flow of operations required to implement the invention with the apparatus depicted in FIG. 1. In particular, broadcast signal 2 is received by apparatus 3, as depicted by 50. The remaining operations depicted in FIG. 2 are performed by controller 19. In particular, controller 19 determines whether decoder 15 has detected a reward data signal, per 52. If it has, then an indicator output signal is generated by controller 19, per 54. Also, controller 19 is responsible for having the reward data for a particular reward coupon stored in short term memory 17, per 56. Controller 19 then also determines whether a print control signal 31 is received from remote control device 27, per 58. If so, then operation 60 sends the signals to reward processing circuit 35 and memories 17 and 39 to collect and process the data required by printer 37 to print a coupon. Finally, printer 37 prints the reward, per 62.

Memory 39 could also have pre-stored therein print data for several different types of formats. Which format is printed depends on a digital bit, for example, included in output signal 2 and processed by controller 19 for input to memory 29 in a well known manner.

Apparatus 3 is a conventional component of a commercially available video and/or audio instrument, such as a TV set. Apparatus 10 could be embodied as a separate box that houses all of its components. Only minimal retrofitting of the TV, for example, would be required in order to implement the invention, such as connecting the broadcast receiver 11 (e.g. TV tuner) to the decoder 15. The connection to the TV set could be with a direct line or by remote signal transmission (e.g. RF, infrared). Other than that, the installation of the box housing apparatus 10 is very simple in that it just needs to be plugged into a wall outlet socket to receive power. Only a one time, fast, simple installation is involved that requires no retrofit of other apparatus in the house.

Alternatively, apparatus 10 could have its circuitry incorporated into the electronics of the TV. For example, the electronics could be fabricated on the semiconductor chip used to control operation of a TV and the viewing of programs on it. Such TV chips are becoming increasingly sophisticated with modern TVs being provided with added functionality approaching that of a computer. The cost of adding such circuitry to a TV chip is minimal considering the large number of chips over which the cost would be spread.

Although a preferred embodiment of the present invention has been described in detail above, various modifications thereto will be readily apparent to anyone with ordinary skill in the art. For example, memories 17 and 39 can be combined. Also, rather than printing the reward as a coupon made of paper and ink, the reward data can be outputted to a portable electronic storage device, such as a smartcard which may be substituted for or used in conjunction with either or both of memories 17 and 19.

Other possible variations include use of printer 37 to print supplemental information other than a reward coupon in place of or in addition to the printing of rewards such as a listing of the rewards stored on the smartcard. Also, indicator 25 can be eliminated by coupling the output signal 23 of controller 19 to the TV inputs so that an icon, for example, is displayed on the screen to provide an effect equivalent to the effect of the indicator. In addition, manual actuation of button 27 to produce signal 31 can be replaced by voice commands, for example. Furthermore, the sequence of steps in the flow charts depicted in the drawings can be modified with equivalent results.

A further variation has to do with the common reward printing data, such as the format or formats, pre-stored in memory 39. It is also feasible to enable the entry of data into memory 39 from a remote station (not shown), as via a suitable wire or wireless communications link (e.g. a telephone line, ISDN line or cable, for example, or a wireless communication system can be used, such as satellite or cellular). This remote entry can be used, for example, to conveniently load new pre-stored formats into memory 39. Various other settable parameters can be set in this manner to provide added convenience and flexibility as features of the invention.

Figure 3:
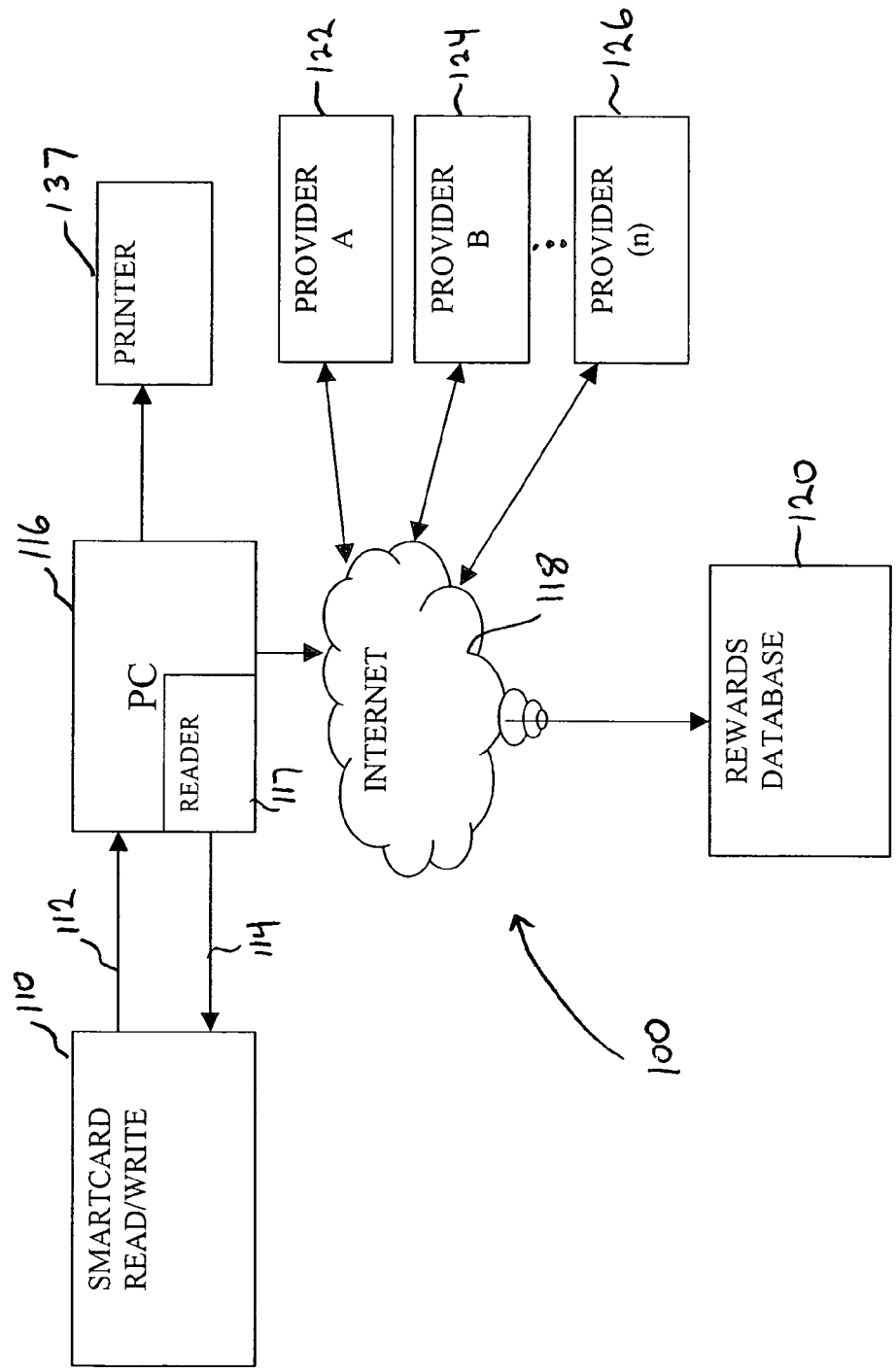
FIG. 3 is a schematic block diagram of another embodiment of the invention.

With reference to FIG. 3, another embodiment 100 of the invention will now be described. The rewards data, as explained above, can be stored on a portable electronic storage device such as a smartcard 110. The data can include general product or service information, rewards information, as well as product manufacturer or service provider information such as website addresses (URL's). The rewards information may also include reward authorization codes 112. The authorization codes are used to control access to the rewards by, for example, only providing access to viewers (or to a certain numbers of viewers) of particular television programming and/or only for a designated time period after a program has aired. For example, certain rewards may only be accessible to viewers who attempt to access the reward within two hours at the conclusion of a particular program which had broadcast the reward data signal. Alternatively, or in addition, a particular reward may be available for a certain number of viewers, e.g. for the first 200 viewers attempting to access the reward, etc.

The smartcard 100 is designed for coupling with a reader 117, as is known in the art, and the reader is connected to a computing device, such as a PC 116, having access to the Internet 118. The computing device 116 may be located remote from the controller 19. The Internet 118 will provide access to multiple websites of the rewards providers, shown as providers 122, 124, 126, etc. The term "reward provider" means any provider of a reward including, but not limited to, the manufacturer of a product or provider of a service on which a reward is offered, or a marketing or advertising service assisting such manufacturers and service providers in the marketing of their products or services. The Internet 118 may, in addition to, or instead of, the reward providers 122, 124, 126, be connected to a dedicated rewards database 120 where all available rewards are listed.

Upon accessing the data on the smartcard 110 when the smartcard is accessed by the reader 117, a menu or listing of the stored data will be displayed on the monitor of PC 116. The viewer can then "click" on one or more desired URL's to access the rewards information as well as other information present at the selected URL. This feature is beneficial because advertisers are now capable of providing viewers with the ability to selectively access, at a later time, additional content concerning certain advertised products or services. By selecting from among the displayed URL's, a determination can be made as to whether the viewer is eligible for the reward. This determination can be established by comparing the smartcard-stored authorization code (shown as element 112) to a stored code located at, or remote from, the accessed website of the reward provider.

If a viewer is eligible for the selected reward, the viewer can "accept" the reward by clicking on an indicator of the reward displayed on the website. In this manner, and as explained above, only a select group of consumers, namely those that have viewed a particular program which caused storage of a particular authorization code on the smartcard, can obtain the reward. This "select" group can be further narrowed by placing restrictions on reward eligibility by, for example, only making the reward available to a certain number of consumers or for a designated period of time. Once authorization, or, if applicable, eligibility, is confirmed, a corresponding reward can be accepted and a coupon can then be printed on the printer 137 connected to the PC 116. After the coupon is printed, the authorization code corresponding to that coupon can then be deleted from the smartcard.

Rather than a viewer browsing to specific individual URL's for separately viewing individual rewards, a designated "rewards" URL along with authorization codes for a plurality of rewards can be stored on the smartcard and then accessed at a later time, i.e. at a time after one or more programs are viewed on the apparatus 3. At the designated rewards URL, the rewards database 120 can be accessed where all rewards corresponding to authorization codes contained on the smartcard may be viewed and information pertaining to the reward-offered products or services can be displayed to the viewer. The viewer can then choose from among available rewards displayed on a menu on the PC display 116 and then print corresponding coupons via printer 137.

Another variation of the invention of FIG. 3 includes the use of reward indicia such as validation codes (shown as element 114) which are stored on the smartcard 110 upon a viewer accessing a particular rewards offer. For example, each reward offer will be associated with a corresponding validation code 114. Upon accessing a desired reward offer from a particular provider website (e.g., 122) or a designated rewards database 120, the validation code 114 associated with that reward will be stored on the smartcard 110 in the event the viewer is eligible for the selected reward. This stored validation code will be used for indicating, at a later time, that the smartcard holder can redeem the reward. A list of the eligible rewards (i.e. the rewards for which validation codes have been stored on the smartcard) can be printed out by the PC printer 137 to indicate the eligible rewards to the viewer. Once the validation codes are stored, the smartcard can be carried by the viewer to a rewards redemption location, such as a retail store, namely, a supermarket, department store, etc. Using the printed list, the viewer can select items corresponding to the eligible rewards stored with the validation codes on the smartcard. At the check-out counter, the smartcard can then simply be swiped at a terminal, whereupon the eligible rewards corresponding to the purchased items will be automatically redeemed and reflected in the overall price of the total goods or services purchased by the viewer. Of course, if a particular reward has redemption criteria, such as a time or amount criteria, the reward may only be redeemed in accordance with that criteria.

It should also be appreciated that instead of a physical rewards redemption location, the smartcard-stored rewards can be used to purchase products via the Internet 118. In this regard, validation codes will be read or otherwise transferred from the smartcard upon checkout from a particular "e-retailer" website for redemption of rewards.

Figure 4:
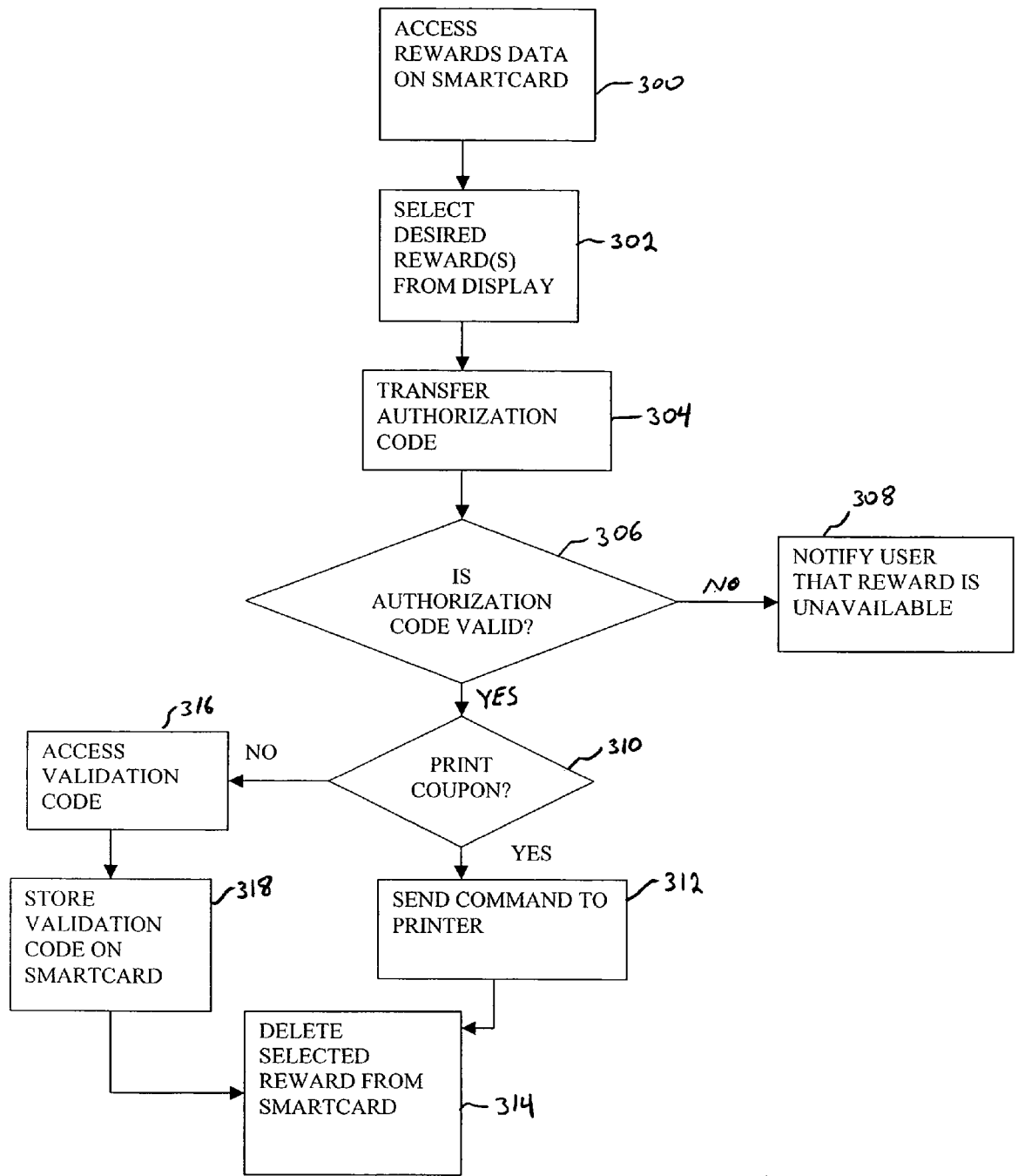
FIG. 4 is a flow chart showing the operations performed by the arrangement of FIG. 3.

FIG. 4 shows a flow of operations required to implement the invention with the apparatus depicted in FIG. 3. In particular, the stored rewards data is accessed from the smartcard by the reader 117, as depicted by 300. Selections from among the available stored rewards data as displayed on the PC 116 are then made, per 302 and authorization codes for the selected rewards are transferred, at 304, to, for example, the reward provider website 122. The authorization codes are then examined for validity (at 306). If the authorization codes are not valid, the smartcard user will be notified, at 308, by displaying an appropriate message on the PC 116. If the authorization code is valid, a coupon pertaining to the desired reward can be printed (at 310), if desired, and a print command will be sent to the printer 137 (at 312). Thereafter, the authorization code pertaining to the selected reward will be deleted from the smartcard at 314. If a printed coupon is not desired, a reward access code will be retrieved at 316 and a corresponding validation code will be stored on the smartcard at 318 for use at a point of purchase of the product or service to which the reward pertains (e.g., at a retail store or website, etc.). Once the corresponding validation code is stored on the smartcard, the authorization code pertaining to that reward can be deleted from the smartcard, at 314.

Figure 5:
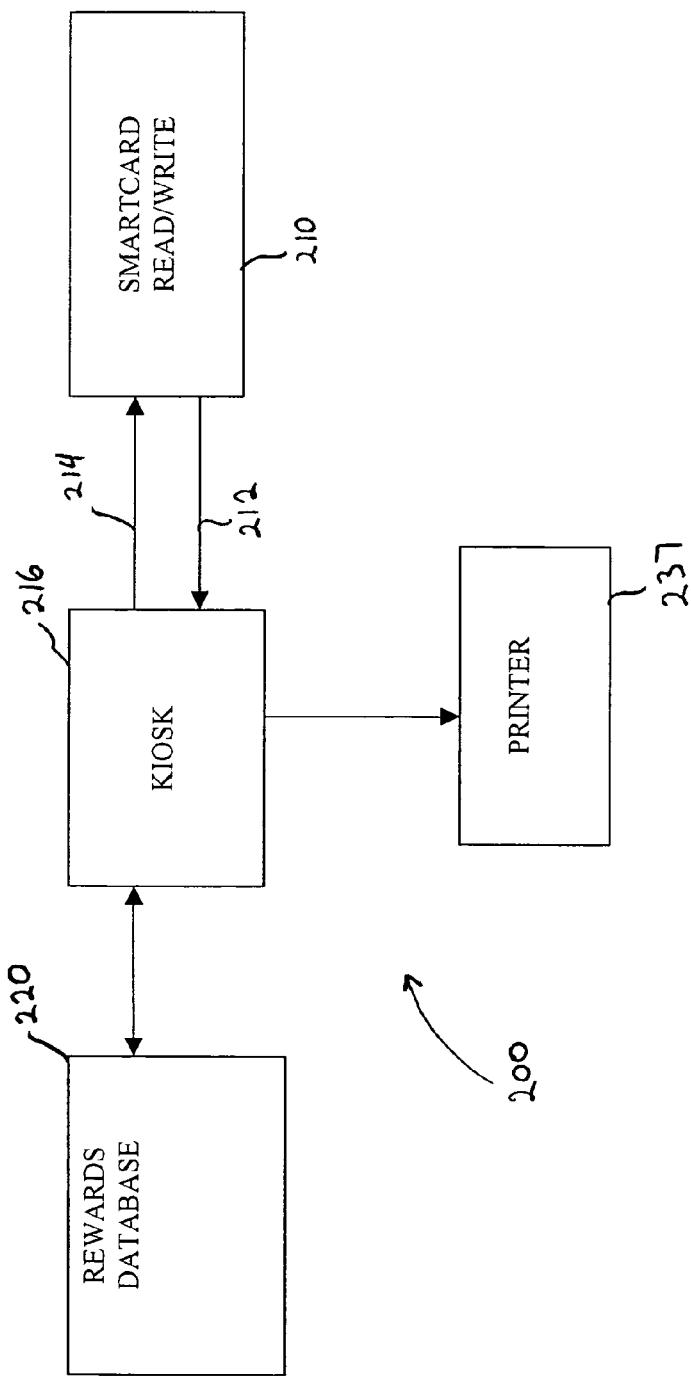
FIG. 5 is a schematic block diagram of a variation of the embodiment of FIG. 3.

Rather than using a PC 116 to access rewards and/or obtain information regarding various advertised products corresponding to the rewards, a designated kiosk 216 may be employed by the smartcard user as shown in the embodiment 200 of FIG. 5. The operation of such kiosks are well known. Consequently, such details are not provided herein. The kiosk 216 can be located, for example, at various retail stores establishments and will have access to a rewards database 220, either located on-site locally at the particular retail store, or accessible via the Internet. The rewards database will contain a list of rewards available for redemption at the particular retail store. To access the rewards, a viewer's smartcard 210 can be inserted into a designated slot on the kiosk 216, whereupon a viewer can then select from among the various available rewards listed on the smartcard and obtain access to a reward if a corresponding authorization code 212 is present on the smartcard 210. As discussed above, individual coupons for the rewards can then be printed out by a printer 237 connected to or integral with the kiosk or, alternatively, validation codes 214 for the selected rewards can be stored on the smartcard 210 for use by the viewer at check-out.

The following variation of the invention is intended to address the possibility of fraudulent use of a coupon printed by printer 137. Conceivably, photocopies of the printed coupon can be made and used in different stores or on different occasions even in the same store, for example. The store would have no way of knowing whether a coupon is the printed original or a photocopy. Thus, a coupon which is intended to be used only once by a particular user could be used many times to buy that product which is covered by the coupon. Accordingly, the invention includes as part of signal 114 an identification code specific to a particular person. That identification code is printed on the coupon along with all the usual content of the coupon. Every coupon would have such an identification code, so if it were to be blanked out on a photocopy it would be suspicious and, therefore, cause for not being honored by a store. Thus, if a person were to make 10 copies of a coupon and use them, all would be honored and the person will have turned in 10 coupons. The stores typically send the coupons they have honored to a coupon clearance center. That center processes data on the coupons it receives and, as a result, it would notice that the same person turned in the same coupon within a short period of time more than once. When such a situation is detected, that identification code on those coupons is downloaded from the center to PCs 116 and/or kiosks 216 which will subsequently block that person from receiving any more coupons. Thus, one fraudulent use will be detected, and then subsequent ones will be prevented. It is contemplated to put a warning on the coupons that multiple use of the coupon is forbidden and will have the above-described consequences.

Of course, the identification code can also be a signal separate from signal 114. The specifics of how the identification code is stored in smartcard 110 and printed on the coupon are readily apparent to anyone with ordinary skill in the art and, therefore, details thereof are not deemed necessary.

The identification code for individuals can be made available in any one of several ways. For example, it can be pre-stored on the smartcard as part of the activation sequence for using the card. Also, it can be part of a sequence for using the invention when a person accesses this service. The person can be required to key in the entire identification code, or the identification code can be pre-stored and then invoked when the person simply types in a password for using the system. Various other ways can be readily thought of to make the identification code available for use in accordance with the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An interactive method for generating a supplementary, program-related output, the method comprising:
    receiving a supplementary, program-related data signal including an authorization code, said supplementary, program-related data signal containing program-related data associated with a programming signal broadcast to a user;
    storing said supplementary, program-related data signal on a portable storage media, wherein retrieval of rewards data corresponding to products or services is enabled by said stored supplementary, program-related data signal, and wherein the authorization code included in said stored supplementary, program-related data signal provides authorization for a reward corresponding to said products or services;
    accessing reward information corresponding to said products or services at a location external to the portable storage media via the Internet; and
    storing validation indicia on said portable storage media in response to accessing the reward information at the location external to the portable storage media, said validation indicia indicating, at a later time, that the reward is redeemable.

2. The interactive method of claim 1, wherein said supplementary, program-related data signal includes all data necessary to produce a human-perceptible output.

3. The interactive method of claim 1, further comprising displaying said retrieved rewards data on a human-perceptible display.

4. The interactive method of claim 3, wherein said human-perceptible output produced from said reward data signal is a discount coupon.

5. The interactive method of claim 1, further comprising the step of displaying at least a portion of said stored supplementary, program-related data on a display device remote from said reproduction equipment.

6. The interactive method of claim 5, wherein said stored supplementary, program-related data is compared to said selected reward to determine compatibility and, if compatibility is determined, said validation indicia is stored on said portable storage media.

7. The interactive method of claim 6, wherein said stored supplementary, program-related data is compared to said selected reward to determine compatibility and, if compatibility is determined, a discount coupon corresponding to said selected reward is printed.

8. The interactive method of claim 7, further comprising the step of deleting data from said portable storage media for preventing access to multiple occurrences of said selected reward upon one of the printing of a discount coupon and the storing of the validation indicia.

9. The interactive method of claim 8, further comprising using said stored supplementary, program-related data signal to access information through the Internet.

10. The interactive method of claim 5, wherein said remote display device comprises a personal computing device.

11. The interactive method of claim 5, wherein said remote display device comprises a public computing device.

12. A system for generating a supplementary, program-related output, comprising:
means for receiving a supplementary, program-related data signal including an authorization code, said supplementary, program related data signal containing program-related data associated with a programming signal, the programming intended for broadcast to a user;
means for storing said supplementary, program-related data signal on a portable storage media, wherein retrieval of rewards data corresponding to products or services is enabled by said stored supplementary, program-related data signal, and wherein the authorization code included in said stored supplementary, program-related data signal provides authorization for a reward corresponding to said products or services;
means for accessing reward information corresponding to said products or services at a location external to the portable storage media via the Internet; and
means for storing validation indicia on said portable storage media in response to accessing the reward information at the location external to the portable storage media, said validation indicia indicating, at a later time, that the reward is redeemable.

13. The system of claim 12, wherein said supplementary, program-related data signal includes all data necessary to produce a human-perceptible output.

14. The system of claim 12, further comprising means for displaying said retrieved rewards data on a human-perceptible display.

15. The system of claim 12, further comprising means for displaying at least a portion of said stored supplementary, program-related data on a display device remote from said reproduction equipment.

16. The system of claim 15, wherein said remote display device comprises a personal computing device.

17. An interactive method for generating a supplementary, program-related output based on a broadcast signal that is a combination of a programming signal and a supplementary, program-related data signal including an authorization code, said method comprising:
receiving said supplementary, program-related data signal including the authorization code;
storing said supplementary, program-related data signal on a portable storage media, wherein retrieval of rewards data corresponding to products or services is enabled by said stored supplementary, program-related data signal, and wherein the authorization code included in said stored supplementary, program-related data signal provides authorization for a reward corresponding to said products or services;
accessing reward information corresponding to said products or services from a location external to the portable storage media via the Internet; and
storing validation indicia on said portable storage media in response to accessing the reward information at the location external to the portable storage media, said validation indicia indicating, at a later time, that the reward is redeemable.

18. A system for generating a supplementary, program-related output based on a broadcast signal that is a combination of a programming signal and a supplementary, program-related data signal including an authorization code, comprising:
means for receiving said supplementary, program-related data signal including the authorization code;
means for storing said supplementary, program-related data signal on a portable storage media, wherein retrieval of rewards data corresponding to products or services is enabled by said stored supplementary, program-related data signal, and wherein the authorization code included in said stored supplementary, program-related data signal provides authorization for a reward corresponding to said products or services;
means for accessing the reward related to said products or services at a location external to the portable storage media via the Internet; and
means for storing validation indicia on said portable storage media in response to accessing the reward information at the location external to the portable storage media, said validation indicia indicating, at a later time, that the reward is redeemable.

* * * * *